July 20, 1948.  E. A. ROCKWELL  2,445,456
BRAKING MEANS FOR CONNECTED VEHICLES
Filed June 9, 1944  3 Sheets-Sheet 1

INVENTOR
*Edward A. Rockwell*
BY
*Arthur Wright*
ATTORNEY

July 20, 1948.  E. A. ROCKWELL  2,445,456
BRAKING MEANS FOR CONNECTED VEHICLES
Filed June 9, 1944  3 Sheets-Sheet 2

INVENTOR
Edward A. Rockwell
BY
ATTORNEY

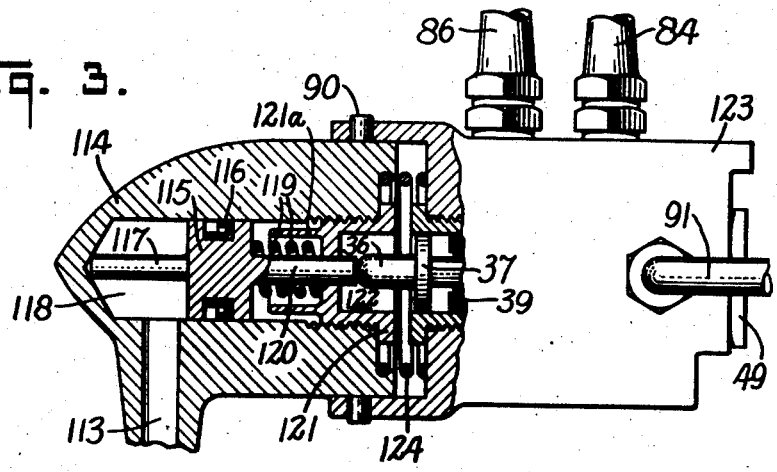

Patented July 20, 1948

2,445,456

UNITED STATES PATENT OFFICE 2,445,456

BRAKING MEANS FOR CONNECTED VEHICLES

Edward A. Rockwell, Cleveland, Ohio

Application June 9, 1944, Serial No. 539,582

11 Claims. (Cl. 188—3)

My invention relates particularly to a system for operating the brakes of a series of vehicles comprising trucks or trailers or airplanes, in an advantageous manner.

The object of my invention is to provide a system for operating a series of trucks or trailers or trucks with trailers or airplanes hydraulically without the necessity of the hydraulic liquid passing through the entire series thereof. A further object is thus to provide effective individual control of the different units of a trailer series so as to render the units of the series independently operable as far as possible. Further objects of my invention will appear from the detailed description of the same hereinafter.

While my invention is capable of embodiment in many different forms for the purpose of illustration I have shown only one form thereof in the accompanying drawings, in which Fig. 1 is a diagrammatic representation of a brake controlling system applied to one or any number of a series of trucks or trailers connected together in accordance with my invention;

Fig. 3 is a longitudinal section of a coupling with a plunger actuator used in controlling the fluid valve;

Fig. 4 is a horizontal section of a double check valve used in connection therewith; and Fig. 5 is a diagrammatic representation of a series of trucks or trailers connected together in accordance with my invention.

Figure 1:
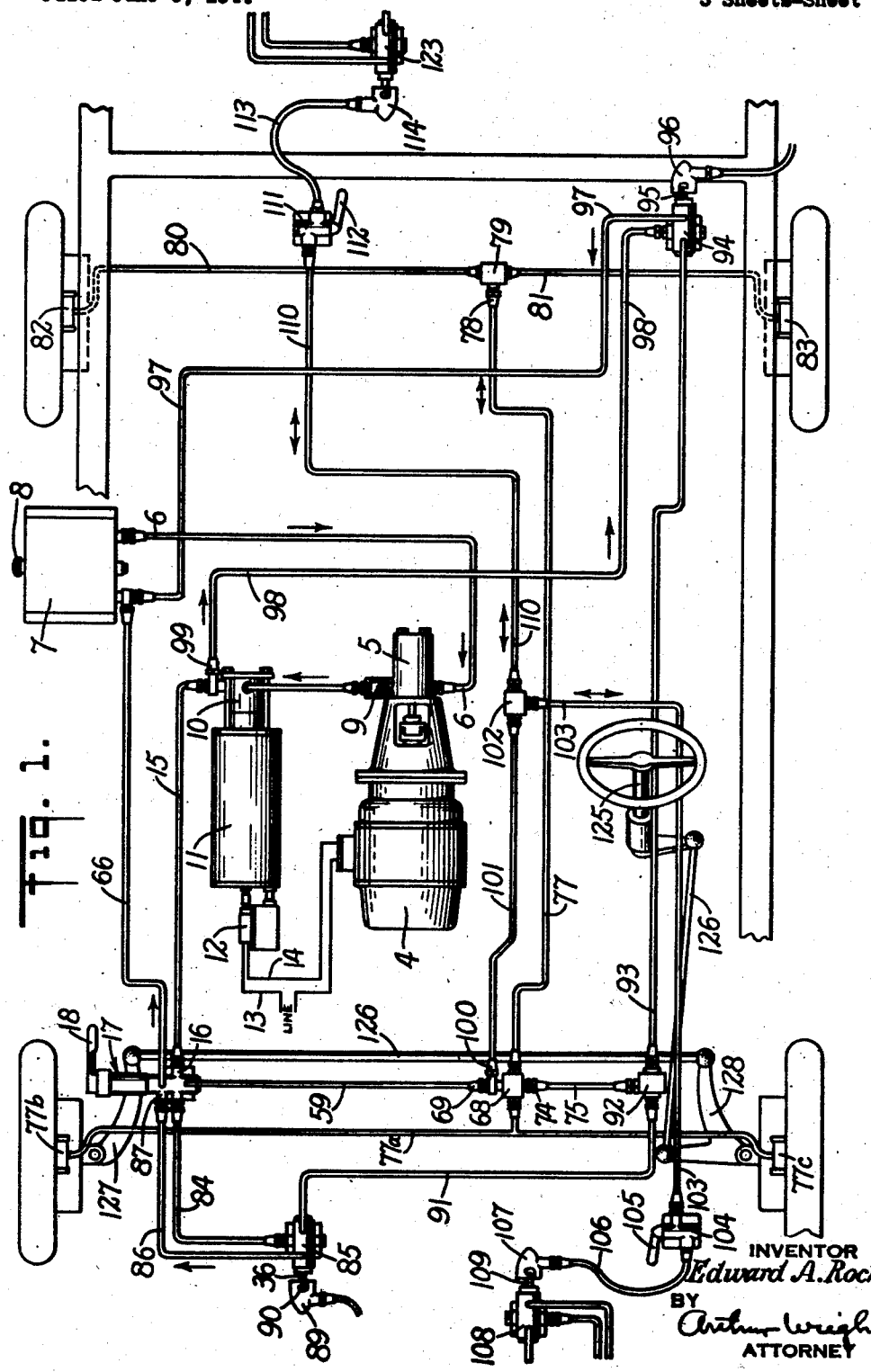
Figure 2:
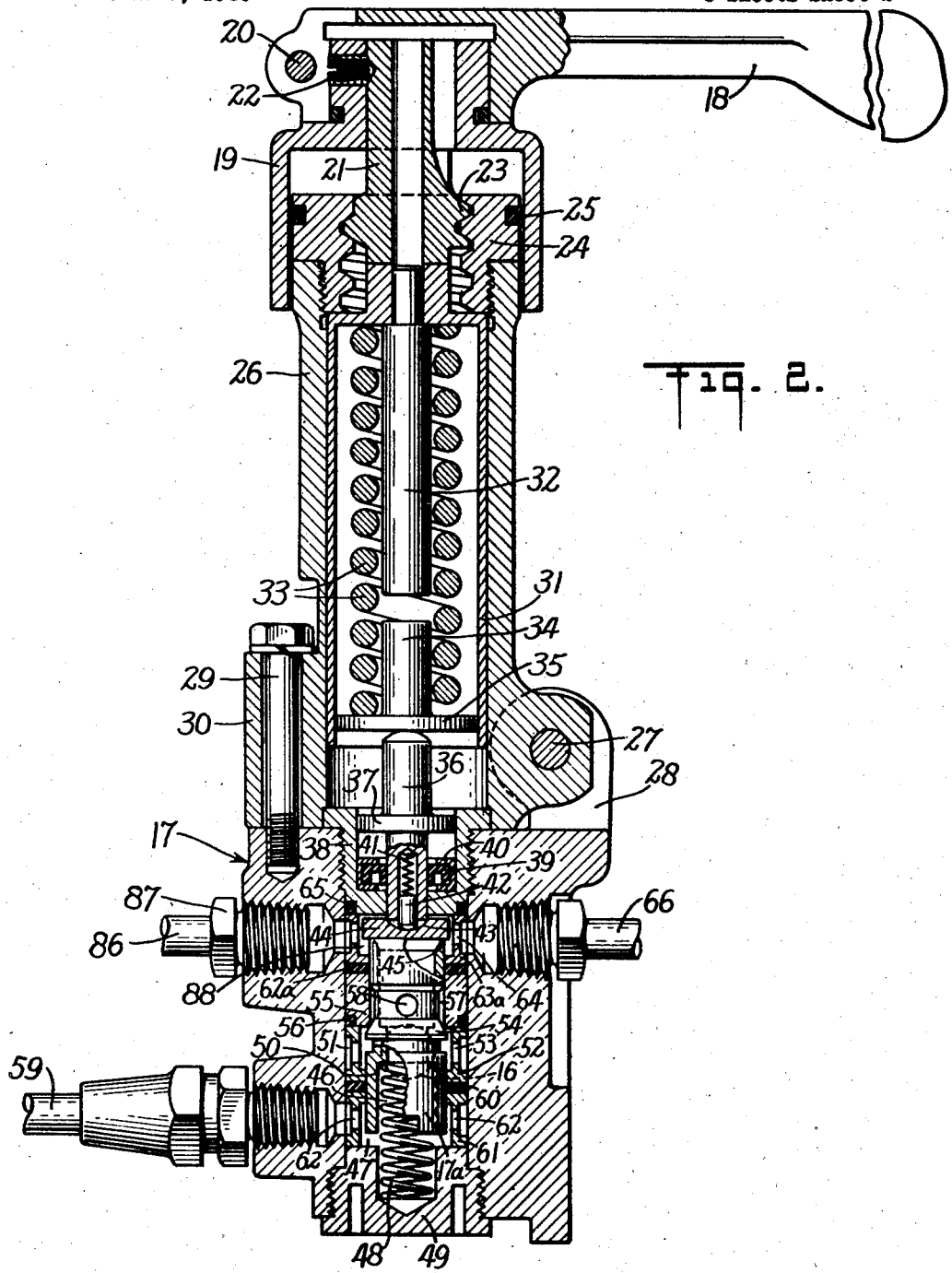
Fig. 2 is a longitudinal section of a hand controlled valve mechanism used thereon.

In the drawings, I have shown a series of automotive vehicles 1, 2 and 3 which may be comprised of tractors or trailers or any one or more of which may be a tractor or trailer and the remainder thereof tractors or trailers. Each of the vehicles 1, 2 and 3 may be equipped with the same kind of system for controlling the brakes and any number or all of the vehicles may be controlled from any one or more of the series of vehicles. By way of example, I have shown in Fig. 1, diagrammatically, a brake controlling system such as may be applied to any one or more of the vehicles 1, 2 and 3, but which is preferably applied to each of the vehicles. For this purpose I have provided a source of hydraulic pressure produced by an electric motor 4, driven from any suitable source of power, which drives a pump 5, the said motor and pump being constructed and arranged as shown in my Patent No. 2,298,512, upon Accumulator for supplying liquid under pressure, granted October 14, 1942. The said pump 5 receives a supply of low pressure liquid from a pipe 6 which is connected to a reservoir 7 having the usual vented filling cap 8. The liquid, after having been placed under pressure by the pump 5, passes through a check valve 9 to a pressure accumulator chamber or reservoir 10 in a pressure accumulator 11 which is preferably constructed as shown in Fig. 6 of my Patent No. 2,298,512 referred to above. The said pressure accumulator 11, as set forth in said patent, is provided with a circuit breaker 12 which is of any desired construction but in which the accumulator details are shown in my said Patent No. 2,298,512, the circuit breaker 12 being connected by wires 13 and 14 leading from any suitable source of electric current to the electric motor 4 so that when the hydraulic pressure in the accumulator reaches a given maximum it will operate the circuit breaker 12 to break the circuit of the said motor 4 and complete said circuit when the hydraulic pressure falls below said maximum. High pressure liquid from the accumulator 11 is delivered by a pipe 15 to a high pressure inlet 16 in a pressure liquid valve casing 17. Said valve casing 17 has within the same a sliding tubular valve member 17a. The said tubular valve member 17a is operated by a hand lever or manual controller 18 which is clamped on the outside of a sleeve 19 by a screw 20. The said sleeve 19 is splined to a screw stem 21 and a screw 22 secures them together. The said screw stem 21 has a screw-thread 23 which meshes with an internally screw-threaded block 24 having a seal 25. The said screw-threaded block 24 is also screw-threaded to an external sleeve 26. The external sleeve 26 is carried by a pivot 27 between ears 28 of the valve casing 17 and is held thereon by a screw 29 passing through a lug 30 on the external casing 26. Within said casing 26 the screw stem 21 presses against an internal sleeve 31 having a centering rod 32 within one end of a coil spring 33, the other end of which is located around a centering pin 34 on a disk 35 which presses against a plunger 36 on a guide disk 37 located within a sleeve 38 screw-threaded in the valve casing 17, which contains the said tubular valve member 17a. Within the screw-threaded sleeve 38 there is provided a U-shaped rubber seal 39 located within an annular retainer ring 40. Furthermore, within the plunger 38 there is a small spring 41 pressing outwardly on a small plunger 42, the other end of which is received in a recess 43 in a disk-shaped valve member 44 in order to lightly hold the disk-shaped valve member 44 against a valve seat 45 on one end of the tubular valve member 17a. The said tubular valve member 17a has a longitudinal passageway 46 through the same which communicates at one end with the valve 44, 45 and at the other end with a chamber 47, in which there is carried a coil spring 48 supported on a screw-threaded plug 49 carried in the valve casing 17. The other end of the spring 48 rests against a shoulder 50 in the longitudinal passageway 46. The incoming high pressure liquid from the pipe 15 is received in a chamber 51 in which there is located an apertured spacing ring 52 having radial apertures 53 and within the said chamber 51 the tubular valve member 17a has an annular tapered modulating valve 54 on the outside thereof which seats against a valve ring 55 having a rubber seal 56 adjacent to the spacing member 52. When the valve member 17a is moved by the valve disk 44 to unseat the valve 54, 55 the high pressure liquid is received in an annular chamber 57 on the outside of the tubular valve member 17a and thence passes by a series of radial apertures 58 into the longitudinal passageway 46 and thereafter into the end chamber 47 and out through a pipe 59 for delivery of the modulated high pressure liquid for the operation of the brakes. The spacing member 52 is supported against an annular rubber seal 60 which is in turn supported by a spacing member 61 having apertures 62, from the screw plug 49. The valve ring 55 is also supported against a rubber seal 62a which in turn is supported against a spacing ring 63a, having apertures 64, and which is supported against the screw sleeve 38 having a rubber seal 65. The valve casing 17, when the valve 44, 45 is open, delivers the exhaust liquid by a pipe 66 back to the reservoir 7. When the said tubular valve member 17a is operated to open the valve 54, 55 to permit passage of modulated high pressure liquid therefrom, which has been received by the pipe 15, the pressure liquid is delivered therefrom by the outlet pipe 59 and the said modulated high pressure liquid is thence delivered to a double check valve 68 to which it is connected by a valve fitting 69. The inner end of the fitting 69 has a valve seat 70 which cooperates with a cylindrical valve 71, provided with one or more longitudinal recesses 72 to permit the passage of liquid when the valve 71 is located away from the valve seat 70. In its lower position the valve 71 is located against a valve seat 73 on a valve fitting 74 which is connected to a pipe 75. Within the casing 68, there is a chamber 76 which communicates with outlet pipes 77 and 77a, the latter leading to front wheel brake hydraulic cylinders 77b and 77c. The pipe 77 has a fitting 78 connected to a T-pipe connection 79 provided with flexible pipes 80 and 81 connected to two rear wheel brake hydraulic cylinders 82 and 83 respectively.

The high pressure inlet pipe 15 enters the annular chamber 51 in the valve casing 17, which is always in open through connection from the pipe 15 to a high pressure liquid pipe 84 which leads to a modulator valve casing 85 containing a tubular valve member constructed the same as the tubular valve member 17a in the valve casing 17, and which is operated in the same way except that it is not equipped with the manual operating handle 18 but has a plunger just like the plunger 37 previously described. This modulating valve casing 85, furthermore, has a return low pressure discharge pipe 86 which is connected to an inlet 87 on the valve casing 17 where it communicates with an annular chamber 88 therein which is also in communication with the pipe 66. The plunger 36 is adapted to be operated from a coupling 89, having bayonet joint pins 90 located on the truck or trailer in front of said plunger 36, and which is constructed just like the similar couplings hereinafter described. When the plunger 36 is thus operated the modulated high pressure liquid will be delivered by a pipe 91 to a double check valve 92 constructed just like the double check valve 68, and which is connected to the outlet pipe 75 leading to the double check valve 68. It will be noted, however, that the double check valve 92, while being constructed the same as the double check valve 68, is in a horizontal position instead of a vertical position so that the cylindrical valve member 71 therein moves between the inlet from the pipe 91 and the inlet from a pipe 93, leading to the double check valve 92, the said inlet pipe 93 being arranged to receive the high pressure liquid discharged from a valve casing 94 which has a tubular valve, constructed the same as the valve within the casings 17 and 87, and is provided with an operating plunger 95 adapted to be operated by a coupling member 96 on the vehicle to the rear and which is constructed like the coupling 89 hereinafter described in detail. The low pressure liquid released from the valve casing 94 is conveyed away by a pipe 97 to the reservoir 7. The supply of high pressure liquid to the valve casing 94 is received from a pipe 98 which is connected by a fitting 99 to the delivery side of the pump 10.

Furthermore, the modulated high pressure liquid delivered by the pipe 59 from the valve casing 17 is connected by means of a fitting 100 to a branch pipe 101 leading to a T-pipe connection 102, one side of which is connected by a pipe 103 to a hand shut-off valve 104 having an operating handle 105 which in turn is connected by a flexible pipe 106 to a coupling 107 constructed like the couplings 89 and 96, for connection to and operation of the same kind of brake system on the vehicle in front and which, for this purpose, is provided with a valve casing 108 containing a valve constructed the same as the valve in the casing 17 and which has an operating plunger 109 adapted to be operated by the modulated pressure liquid and coupled to the coupling 107. Also, the said T-pipe connection 102 is connected by a pipe 110 to a hand valve 111 constructed like the hand valve 104 and having an operating handle 112. This valve 111 is connected by a flexible pipe 113 to a coupling part 114 which is constructed like the couplings 89, 96 and 107. The said coupling part 114 has within the same a piston 115 provided with an annular rubber seal 116 and a forwardly directed stop rod 117 which, in its end position, contacts with the interior of the casing of the coupling part 114. This forms a chamber 118 to receive the modulated high pressure liquid, so as to move, accordingly, the said piston 115 outwardly against the force of a coil spring 119 which is located around a plunger 120 passing outwardly through a cap 121 screw-threaded within the casing of the coupling part 114 and having an annular stop 121a cooperating with the piston 115. The said coupling part 114, furthermore, has a recess 122 adjacent to the outer end of a valve casing 123 on the vehicle to the rear and having a spring 124 which is arranged to secure the parts together while the coupling part 114 and valve casing 123 are coupled together. It will be understood that the valve casing 123, forming one part of the coupling, and the other part of the coupling 114, as in the case of similar couplings and valve casings at the four corners of the vehicle, may be coupled together or fastened by bayonet joints of any desired or usual type, so that in this way any number of vehicles, having brake operating systems of this character, may be coupled together in order that, at the front or rear or both ends of a particular vehicle, a coupling and valve casing on one end of the vehicle may be attached or coupled together with a coupling and valve casing on the adjacent end of the adjacent vehicle. However, when each particular coupling and its valve casing are disconnected there will be no escape of liquid from either thereof, but when connected together there will be the means of communicating hydraulic pressures from the coupling to the valve casing but without, however, the passage of the liquid from one to the other.

It will be understood, of course, that each of the vehicles or all thereof may have the customary steering column 125 connected by a steering rod 126 to steering arms 127 and 128 on the front wheels, respectively.

In the operation of the system, it will be understood that the brakes on any one of the vehicles, operated alone or in series, will be controlled by the movement of the handle 18 or any other similar manual operating means, so that by the closing of the valve 44, 45 and the opening to the extent desired of the valve 54, 55, the modulated high pressure will be delivered by the pipe 59 and thence by the double check valve 68 to the pipe 77 and thence to the cylinders 82 and 83 so as to apply the brakes on the respective wheels. Furthermore, when the particular vehicle is connected to one or more other vehicles the connection of the various couplings to other valve casings will enable all of the other vehicles connected in series to have the brakes of said other vehicles controlled by the said handle 18 when desired. For example, when the high pressure modulated liquid is received in the coupling 114 it will operate the plunger 36 and consequently operate the modulating valve within the valve casing 123 to apply the delivered modulated high pressure liquid therefrom to the brakes for the operation of the same on the vehicle on which the valve casing 123 is located. Furthermore, on the vehicle at the rear of the vehicle carrying the handle 18, the brakes on the vehicle in front thereof can be similarly controlled by the coupling member 96. Also, the vehicle carrying the handle 18 can be likewise controlled by a similar handle on the vehicle at the front thereof by means of the coupling 89 and the valve casing 85. In other words, not only can the individual vehicle be controlled by this system but any one of a series of such vehicles connected together can be operated to control the brakes on all of the series and without the transfer of any liquid from one of the vehicles to any of the others. Or, in fact, the application of the brakes could be, if desired, controlled simultaneously from all of the series, from a plurality of individual vehicles by the simultaneous operation of the manual controlling handles on these several vehicles. However, when the vehicles are uncoupled from the series there is no loss of liquid as the liquid for each vehicle is retained within the system of the particular vehicle. Throughout the operation of the braking system for each particular vehicle a given desired high pressure of the high pressure liquid is maintained by means of the spring accumulator 88 which accumulates the desired maximum pressure in the liquid by energizing the motor 4 and driving the pump 5 when the liquid falls below the said maximum pressure. When, however, the maximum pressure is reached the circuit breaker 12 is operated to disconnect the circuit from the motor 4. For instance, when the brake handle 18 is operated, the accumulator having therein liquid under a definite pressure, provided by the pump 5 driven by the electric motor 4 until the motor circuit is broken by the circuit breaker 12, the pressure liquid in modulated amounts will be delivered by the valve 54, 55, after closing the valve 44, 45, to the pipe 59, to the double check valve 68, to the pipes 77 and 77a, and from the pipe 77 to the rear brake cylinders 82 and 83 and by the pipe 77 into the brake cylinders 77b and 77c. Simultaneously with the application of the pressure liquid to the brake cylinders 82, 83, 77b and 77c the modulated pressure liquid will pass by the pipes 110 and 103 to similar control valves 123 and 108 to control in the same way vehicles in the rear or front of the car carrying the valve 18. When the valve 54, 55 is closed and the valve 44, 45 is opened the liquid from the brake cylinders 82, 83, 77b and 77c will be discharged from the valve 44, 45 to the pipe 66 and thence to the reservoir 7, from which it is supplied to the pump 5 to be put under pressure again. This same kind of actuation or control of the car shown in Fig. 1 can be effected by controlling said car from the car in the front thereof by means of the coupling 89 on the car in front or the coupling 96 in the car at the rear thereof, each of which is operated by a hand lever 18 with its attached valves like the valves 54, 55 and 44, 45. The high pressure liquid supply for this purpose is received from the pipe 84 or the pipe 98 and the resulting modulated pressures are delivered by the pipes 91 and 93, respectively, whereas the discharged liquid is returned by the pipes 86 and 97, respectively, to the storage reservoir 7. The modulated pressure liquid from the pipes 91 and 93, respectively, is delivered to the double check valve 68, from which the modulated pressure liquid can be delivered to the front and rear brake cylinders 82, 83, 77b and 77c from any one or all of the pipes 91, 93 and 59.

While I have described my invention above in detail I wish it to be understood that many changes may made therein without departing from the spirit of the same.

I claim:

1. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously.

2. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto, and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously, the said braking means on one of said plurality being hydraulic and having a mechanical connection adapted to operate the braking means on another of said plurality of vehicles.

3. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously, the said braking means on one of said plurality being hydraulic and having a mechanical connection adapted to operate the braking means on another of said plurality of vehicles on which the braking means is hydraulic and has no fluid transference to said first mentioned one of said plurality.

4. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously, the said braking means on one of said plurality being hydraulic and having a mechanical connection adapted to operate the braking means on another of said plurality of vehicles on which the braking means is hydraulic, and provided with a disconnectable coupling, and has no fluid transference to said first mentioned one of said plurality.

5. A succession of connected vehicles having a braking means on a plurality of the individual vehicles thereof, said braking means being constructed and connected so as to operate together, and a manual controlling device, each comprising a modulating valve, an accumulator, operable independently of the other accumulators, for supplying power pressure liquid thereto and a reservoir connected between the accumulator and the valve to receive the discharge from the valve, located on each of said plurality of vehicles constructed and arranged to operate the braking means on all of said plurality of vehicles from each of the same, the said braking means on one of said plurality being hydraulic and having a mechanical connection adapted to operate the braking means on another of said plurality of vehicles on which the braking means is hydraulic, and provided with a disconnectable coupling, and has no fluid transference to said first mentioned one of said plurality, and each of said plurality and its adjacent vehicle having such a disconnectable coupling as well as a disconnectable hydraulic brake operating valve cooperating therewith.

6. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously, the said braking means on one of said plurality being hydraulic and having a mechanical connection adapted to operate the braking means on another of said plurality of vehicles on which the braking means is hydraulic, and provided with a disconnectable coupling, and has no fluid transference to said first mentioned one of said plurality, and each of said plurality and its adjacent vehicle having such a disconnectable coupling as well as a disconnectable hydraulic brake operating valve cooperating therewith.

7. A succession of connected vehicles having a braking means on a plurality of the individual vehicles thereof, said braking means being constructed and connected so as to operate together, and a manual controlling device each comprising a modulating valve, an accumulator, operable independently of the other accumulators, for supplying power pressure liquid thereto and a reservoir connected between the accumulator and the valve to receive the discharge from the valve and including a double check valve connected between the deliveries of a plurality of the modulating valves, located on each of said plurality of vehicles constructed and arranged to transmit liquid pressure from one or more of said vehicles simultaneously so as to operate the braking means on one or more of said plurality of vehicles from each and all of the same simultaneously, the said braking means on one of said plurality being hydraulic and having a mechanical connection adapted to operate the braking means on another of said plurality of vehicles, and comprising a conduit for high pressure liquid, the said manual controlling device comprising a pump in circuit with the accumulator and electrically controlled by the latter to enable the braking means to receive the modulated pressure.

8. A succession of connected vehicles, each having a power unit and a brake operable by the power unit as well as a combined coupling and valve with a valve casing between adjacent vehicles of said succession, the valve having a plunger operating the same, said plunger and one part of the coupling being on one of the adjacent vehicles and the other part of the coupling being adjacent to said valve and its part of the coupling, the other part of the coupling being so located that the plunger is operable from said other part of the coupling on the other one of the adjacent vehicles, and control means on one of the vehicles for operating said valve at will to control the operation of a brake.

9. A succession of connected vehicles, each having a power unit and a brake operable by the power unit as well as a combined coupling and valve between adjacent vehicles of said succession, the valve having a plunger operating the same, said plunger and one part of the coupling being on one of the adjacent vehicles and the other part of the coupling and a second plunger for operating the valve being adjacent to said valve and its part of the coupling, the other part of the coupling being so located that the plunger is operable from said other part of the coupling on the other one of the adjacent vehicles, and control means on one of the vehicles for operating said valve at will to control the operation of a brake.

10. A succession of connected vehicles, each having a power unit and a brake operable by the power unit as well as a combined coupling and a valve between adjacent vehicles of said succession, the valve having a plunger operating the same, said plunger and one part of the coupling being on one of the adjacent vehicles and the other part of the coupling being adjacent to said valve and its part of the coupling, the other part of the coupling being so located that the plunger is operable from said other part of the coupling on the other one of the adjacent vehicles, and control means, comprising a manually operable hydraulic modulating valve connected between the power unit and said plunger, on one of the vehicles for operating said valve at will to control the operation of a brake.

11. A succession of connected vehicles, each having a power unit and a brake operable by the power unit as well as a combined coupling and valve between adjacent vehicles of said succession, the valve having a plunger operating the same, said plunger and one part of the coupling being on one of the adjacent vehicles and the other part of the coupling and a second plunger for operating the valve being adjacent to said valve and its part of the coupling, the other part of the coupling being so located that the plunger is operable from said other part of the coupling on the other one of the adjacent vehicles, and control means, comprising a manually operable hydraulic modulating valve connected between the power unit and said plunger, on one of the vehicles for operating said valve at will to control the operation of a brake.

EDWARD A. ROCKWELL.

REFERENCES CITED

The following references are of record in the file of this patent:

UNITED STATES PATENTS

| Number | Name | Date |
|---|---|---|
| 1,682,308 | Schaede | Aug. 28, 1928 |
| 2,028,631 | Stevens | Jan. 21, 1936 |
| 2,112,427 | Sexton | Mar. 29, 1938 |
| 2,202,070 | Van Deren | May 28, 1940 |
| 2,215,051 | Pardee | Sept. 17, 1940 |
| 2,267,656 | Jeffrey | Dec. 23, 1941 |

FOREIGN PATENTS

| Number | Country | Date |
|---|---|---|
| 547,062 | France | Nov. 30, 1922 |